(12) United States Patent
Tak et al.

(10) Patent No.: US 9,069,668 B2
(45) Date of Patent: Jun. 30, 2015

(54) DIAGNOSING DISTRIBUTED APPLICATIONS USING APPLICATION LOGS AND REQUEST PROCESSING PATHS

(71) Applicant: International Business Machines Corporation, Armonk, NY (US)

(72) Inventors: Byung Chul Tak, Elmsford, NY (US); Chunqiang Tang, Ossining, NY (US); Long Wang, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 239 days.

(21) Appl. No.: 13/676,855

(22) Filed: Nov. 14, 2012

(65) Prior Publication Data

US 2014/0136896 A1 May 15, 2014

(51) Int. Cl.
  *G06F 11/00* (2006.01)
  *G06F 11/07* (2006.01)
  *G06F 11/263* (2006.01)
  *G06F 11/36* (2006.01)

(52) U.S. Cl.
  CPC .......... *G06F 11/079* (2013.01); *G06F 11/0787* (2013.01); *G06F 11/263* (2013.01); *G06F 11/3688* (2013.01)

(58) Field of Classification Search
  CPC .................. G06F 11/263; G06F 11/3688
  USPC .................................................. 714/32, 38.1
  See application file for complete search history.

(56) References Cited

U.S. PATENT DOCUMENTS

| | | | |
|---|---|---|---|
| 5,463,768 A | 10/1995 | Cuddihy et al. | |
| 6,247,149 B1 | 6/2001 | Falls et al. | |
| 6,795,935 B1 | 9/2004 | Unkle et al. | |
| 7,100,084 B2 | 8/2006 | Unkle et al. | |
| 7,194,664 B1 | 3/2007 | Fung et al. | |
| 7,284,153 B2 | 10/2007 | Okbay et al. | |
| 7,379,846 B1 | 5/2008 | Williams et al. | |
| 7,707,559 B2* | 4/2010 | Reddy | 717/131 |
| 7,930,590 B2 | 4/2011 | Cheng et al. | |
| 8,276,020 B2* | 9/2012 | Cates | 714/28 |
| 8,381,192 B1* | 2/2013 | Drewry et al. | 717/128 |
| 8,448,027 B2* | 5/2013 | Elnozahy et al. | 714/41 |

(Continued)

OTHER PUBLICATIONS

International Search Report and Written Opinion of PCT/US2013/069867, May 13, 2014, pp. 1-8.

(Continued)

*Primary Examiner* — Yolanda L Wilson
(74) *Attorney, Agent, or Firm* — Louis Percello

(57) ABSTRACT

A method for monitoring a distributed application for errors includes constructing a transaction path for each request received by the distributed application, detecting a writing action to a log of the distributed application, and annotating the transaction path in accordance with the writing action to produce an annotated transaction path. In another embodiment, a method for building a knowledge base for use in diagnosing an error occurring in a distributed application includes executing the distributed application on a replica of a production server that supports the distributed application, constructing a transaction path for a request received by the distributed application, wherein the transaction path traverses the replica, injecting a fault into the transaction path, detecting a writing action to a log of the distributed application, wherein the writing action is a response to the fault, and storing an association between the fault and the writing action.

20 Claims, 8 Drawing Sheets

(56) References Cited

U.S. PATENT DOCUMENTS

| | | | |
|---|---|---|---|
| 2003/0126505 A1* | 7/2003 | Lacey, III | 714/38 |
| 2004/0039728 A1* | 2/2004 | Fenlon et al. | 707/1 |
| 2004/0243882 A1 | 12/2004 | Zhou et al. | |
| 2006/0085798 A1 | 4/2006 | Bendiksen et al. | |
| 2006/0248405 A1* | 11/2006 | Ponczak et al. | 714/38 |
| 2009/0222436 A1 | 9/2009 | Nastacio et al. | |
| 2010/0318849 A1* | 12/2010 | Magidson et al. | 714/32 |
| 2011/0016356 A1* | 1/2011 | Artzi et al. | 714/38 |
| 2011/0185234 A1 | 7/2011 | Cohen et al. | |

OTHER PUBLICATIONS

D. Yuan, H. Mai, W. Xiong, L. Tan, Y. Zhou, and S. Pasupathy. SherLog: Error Diagnosis by Connecting Clues from Run-time Logs In Architectural Support for Programming Languages and Operating Systems, Mar. 2010 . consists of 12 unnumbered pages.

B.C. Tak, C. Tang, C. Zhang, S. Govindan, B. Urgaonkar, and R.N. Chang. "vPath: Precise Discovery of Request Processing Paths form Black-box Observations of Thread and Network Activities" In Proceedings of USENIX, San Diego, CA, USA, Oct. 2009.

M.K. Aguilera, J.C. Mogul, J.L. Wiener, P. Reynolds, and A. Muthitacharoen. "Performance Debugging for Distributed Systems of Black Boxes". In *SOSP'03*.

W. Jiang, C. Hu, S. Pasupathy, A. Kanevsky, Z. Li, Y Zhou. "Understanding Customer Problem Troubleshooting from Storage System Logs" $7^{th}$ USENIX Conference, Jan. 14, 2009.

W. Xu, L. Huang, M. Jordan, D. Patterson, and A. Fox. "Mining Console Logs for Large-Scale System Problem Detection". In *SOSP'09*.

K. Fisher, D. Walker, K. Q. Zhu, and P. White. "From Dirt to Shovels: Fully Automatic Tool Generation from Ad Hoc Data". In *POPL'08*.

\* cited by examiner

DIAGNOSING DISTRIBUTED APPLICATIONS USING APPLICATION LOGS AND REQUEST PROCESSING PATHS

BACKGROUND OF THE INVENTION

The present invention relates generally to distributed applications and relates more specifically to error diagnosis in distributed applications.

The goal of distributed application diagnosis is to determine the root cause of a problem (i.e., the first event that led to an observed error). Although the problem can usually be solved easily once the root cause is known, determining the root cause is non-trivial, particularly in distributed environments.

One conventional method for diagnosing distributed applications involves manually interpreting application logs. However, application logs alone typically will not reveal the root cause, because even when they include log statements in their code to assist in diagnosis, these statements often contain incomprehensible, indirect, and/or misleading descriptions of the problem. In addition, temporal and spatial gaps often exist between when and where the problem occurs and when and where the log is recorded. Diagnosis becomes even more difficult when the application topology is more dynamic (e.g., due to virtualization, auto scaling, migration, and the like, as may be the case when deployed in the cloud).

SUMMARY OF THE INVENTION

A method for monitoring a distributed application for errors includes constructing a transaction path for each request received by the distributed application, detecting a writing action to a log of the distributed application, and annotating the transaction path in accordance with the writing action to produce an annotated transaction path.

In another embodiment, a method for building a knowledge base for use in diagnosing an error occurring in a distributed application includes executing the distributed application on a replica of a production server that supports the distributed application, constructing a transaction path for a request received by the distributed application, wherein the transaction path traverses the replica, injecting a fault into the transaction path, detecting a writing action to a log of the distributed application, wherein the writing action is a response to the fault, and storing an association between the fault and the writing action.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the invention is a method and apparatus for diagnosing distributed applications. Embodiments of the invention link the human-readable error logs produced by a distributed application to the causal chain (i.e., transaction/request execution paths) of system activities in order to trace observed errors back to their root causes. Diagnosis can be performed online (i.e., while the system performing the diagnosis is connected to the application being diagnosed) or offline (i.e., while the system performing the diagnosis is disconnected to the application being diagnosed). This approach bridges the gaps between operating system-level events with application semantics, which improves the interpretability of application events. Further embodiments of the invention use fault injection techniques to build a knowledge base that facilitates the identification of a root cause for an observed problem.

Figure 1:
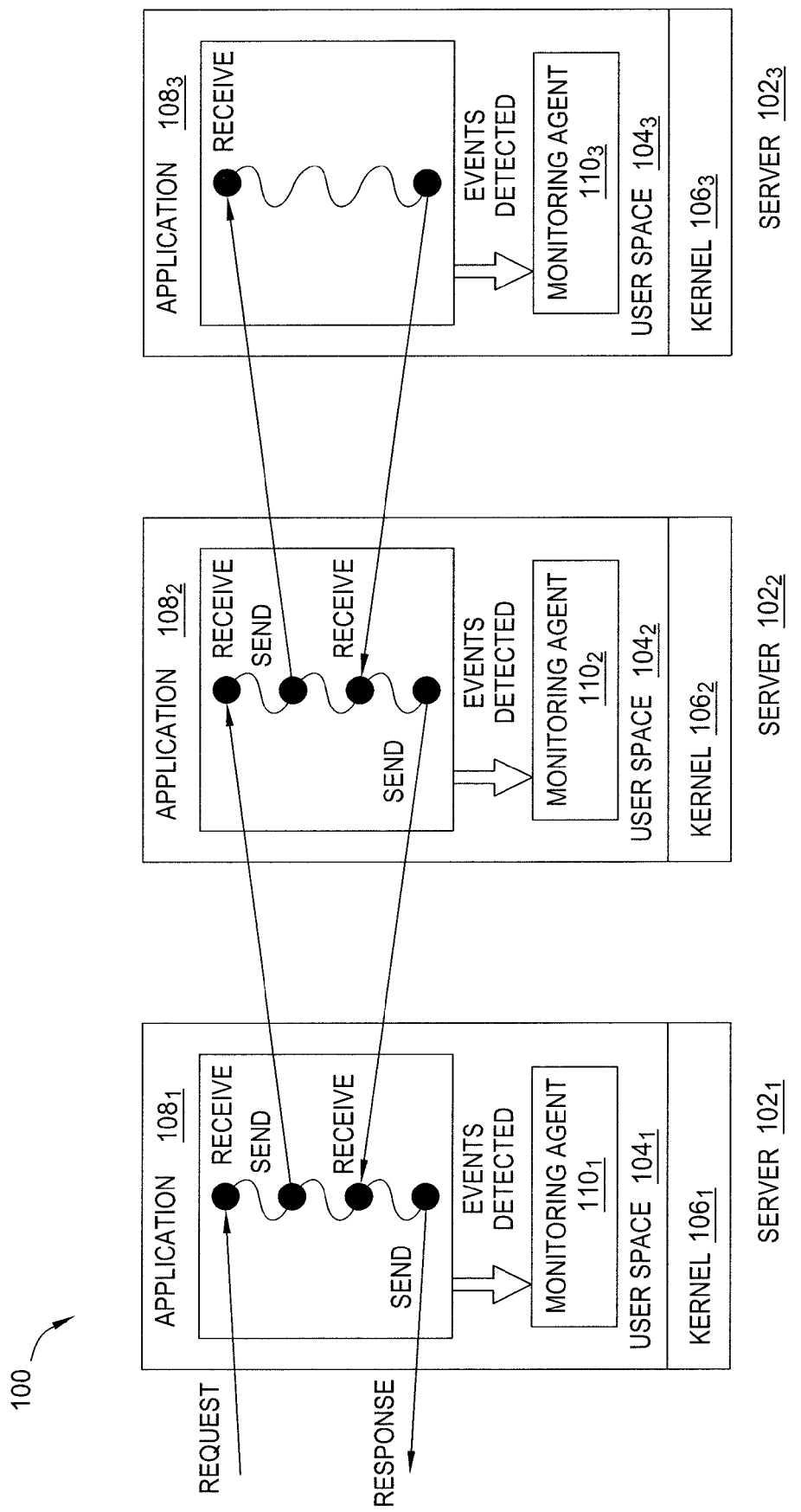
FIG. 1 is a block diagram illustrating an exemplary distributed application that may be diagnosed according to embodiments of the present invention.

FIG. 1 is a block diagram illustrating an exemplary distributed application 100 that may be diagnosed according to embodiments of the present invention. As illustrated, the distributed application 100 comprises a plurality of cooperating servers $102_1$-$102_3$ (hereinafter collectively referred to as "servers 102") that support the distributed application 100 by performing a plurality of tasks, including tasks related to presentation, application processing, and data management. These servers 102 might include, for example, one or more hypertext transfer protocol (HTTP) servers, application servers, and/or relational database management systems. Although FIG. 1 illustrates three servers 102, it is understood that the distributed application 100 can comprise any number of servers, and the present invention is not limited by the example illustrated in FIG. 1.

Each of the servers 102 generally comprises a user space $104_1$-$104_3$ (hereinafter collectively referred to as "user spaces 104") and a kernel $106_1$-$106_3$ (hereinafter collectively referred to as "kernels 106"). The user space 104 comprises a portion $108_1$-$108_3$ (hereinafter collectively referred to as "portions 108") of the distributed application 100 (i.e., specifically processes or threads associated with the distributed application 100), while the kernel 106 operates as a bridge between the distributed application 100 and the hardware that performs processing according to the distributed application 100. For instance, the kernel 106 makes computing resources available to the distributed application 100 via system calls.

In one embodiment, the user space 104 additionally comprises a monitoring agent $110_1$-$110_3$ (hereinafter collectively referred to as "monitoring agents 110"). The monitoring agent 110 is the main component responsible for diagnosing problems in the distributed application 100. To this end, the monitoring agent 110 monitors low-level events, constructs request processing paths and causal paths, locates application log files (which may be distributed over the plurality of servers 102), detects write events on the log files, and annotates the processing paths with logged data.

As illustrated, the servers 102 cooperate to process user requests by exchanging messages with each other. For example, a request (e.g., an HTTP request) may first arrive at server $102_1$, which in one embodiment is an HTTP server, where the request is assigned to a first thread for processing. The server $102_1$ may then forward the request to the server $102_2$, which in one embodiment is an application server, where the request is assigned to a second thread for processing. The server $102_2$ may finally forward the request to the server $102_3$, which in one embodiment is a database server, where the request is assigned to a third thread for processing. Responsive to the request, the server $102_3$ may forward a response intended for the request's originator, where the request is forwarded through the servers $102_2$ and $102_1$ (and processed by threads at each server 102) before being delivered to the originator. Although FIG. 1 illustrates the arrival of one request, it is understood that in reality, the distributed application 100 will typically receive many different requests simultaneously every second, and all of these requests are handled in the manner described above.

The processing described above comprises a plurality of events (e.g., "RECEIVE" and "SEND" events, among others) that collectively form a path that a request takes across the distributed application 100 during processing. This path is illustrated in FIG. 1 by a plurality of arrows. Such paths are not typically easily available for review by administrators. The monitoring agent 110 of each server 102 detects and logs events occurring at the respective server 102 for potential use in diagnosing problems that occur in the distributed application 100. One specific embodiment of a method for diagnosing problems according to the present invention is discussed in greater detail in connection with FIG. 3.

Figure 2:
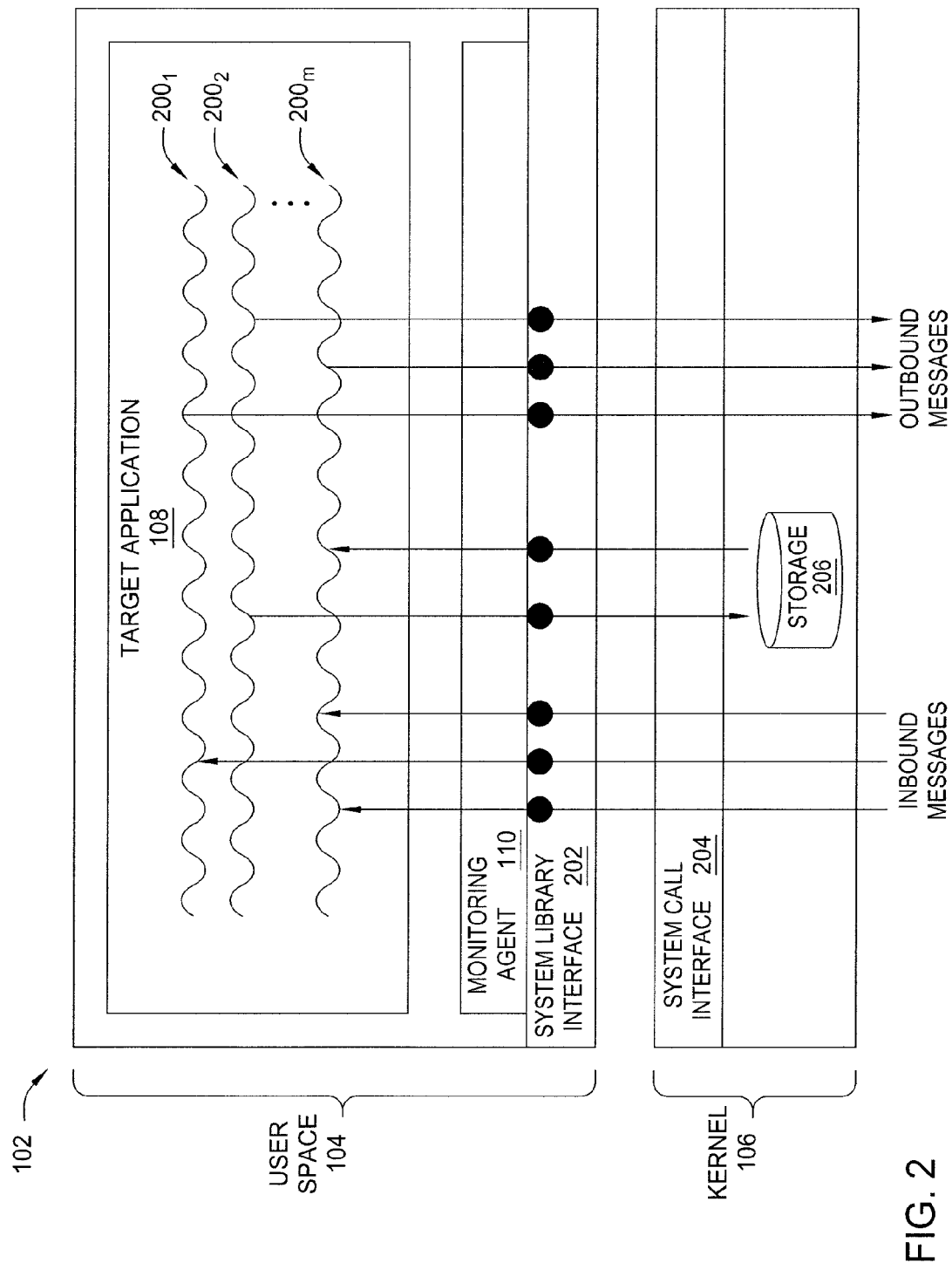
FIG. 2 is a block diagram illustrating one embodiment of a server of FIG. 1 in more detail, according to the present invention.

FIG. 2 is a block diagram illustrating one embodiment of a server 102 of FIG. 1 in more detail, according to the present invention. The server 102 illustrated in FIG. 2 may be any of the servers 102 illustrated in FIG. 1. In particular, FIG. 2 illustrates an embodiment in which the monitoring agent 110 of the server 102 is implemented at the system library layer of the server 102.

As discussed above, the processes of the distributed or "target" application 100 are executed in the user space 104 of the server 102 as a plurality of threads $200_1$-$200_m$, (hereinafter collectively referred to as "threads 200"). In addition, the user space 104 includes the monitoring agent 110 and a system library interface 202. The target application 100 dynamically links to the system library interface 202 under normal operations. However, according to embodiments of the present invention, the target application 100 is linked to the monitoring agent 110 at the start time, so that all events occurring at the system library level (indicated by darkened circles in FIG. 2) will be intercepted by the monitoring agent 110. The monitoring agent then forwards the library invocations to the appropriate system library after examining and processing the intercepted calls. For instance, in one embodiment, where the server 102 employs a Linux operating system, a dynamic linking method can be used by setting the LD_PRELOAD environment variable.

In this embodiment, the kernel 106 of the server 102 includes a system call interface 204 and storage 206 (e.g., a database). In one embodiment, the storage 206 stores data relating to the target application's resource usage, internal threading structure, and/or transaction paths.

Figure 3:
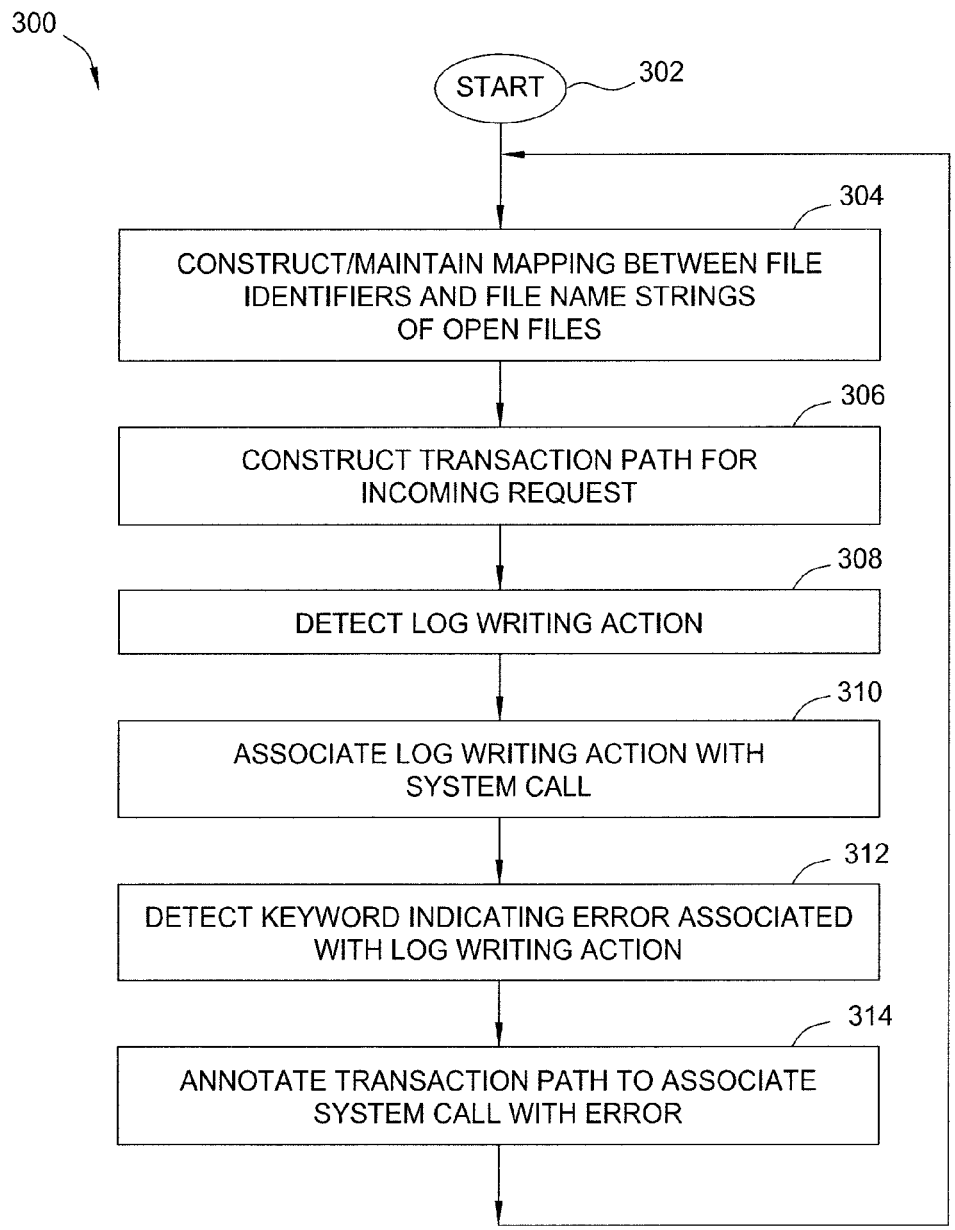
FIG. 3 is a flow diagram illustrating one embodiment of a method for diagnosing a problem in a distributed application, according to the present invention.

FIG. 3 is a flow diagram illustrating one embodiment of a method 300 for diagnosing a problem in a distributed application, according to the present invention. The method 300 may be performed, for example, by any of the monitoring agents 110 illustrated in FIGS. 1 and 2 (perhaps in conjunction with other components of the distributed application 100). As such, reference is made in the discussion of the method 300 to various items illustrated in FIGS. 1 and 2. However, the method 300 is not limited by the configuration of the application illustrated in FIGS. 1 and 2.

Figure 4:
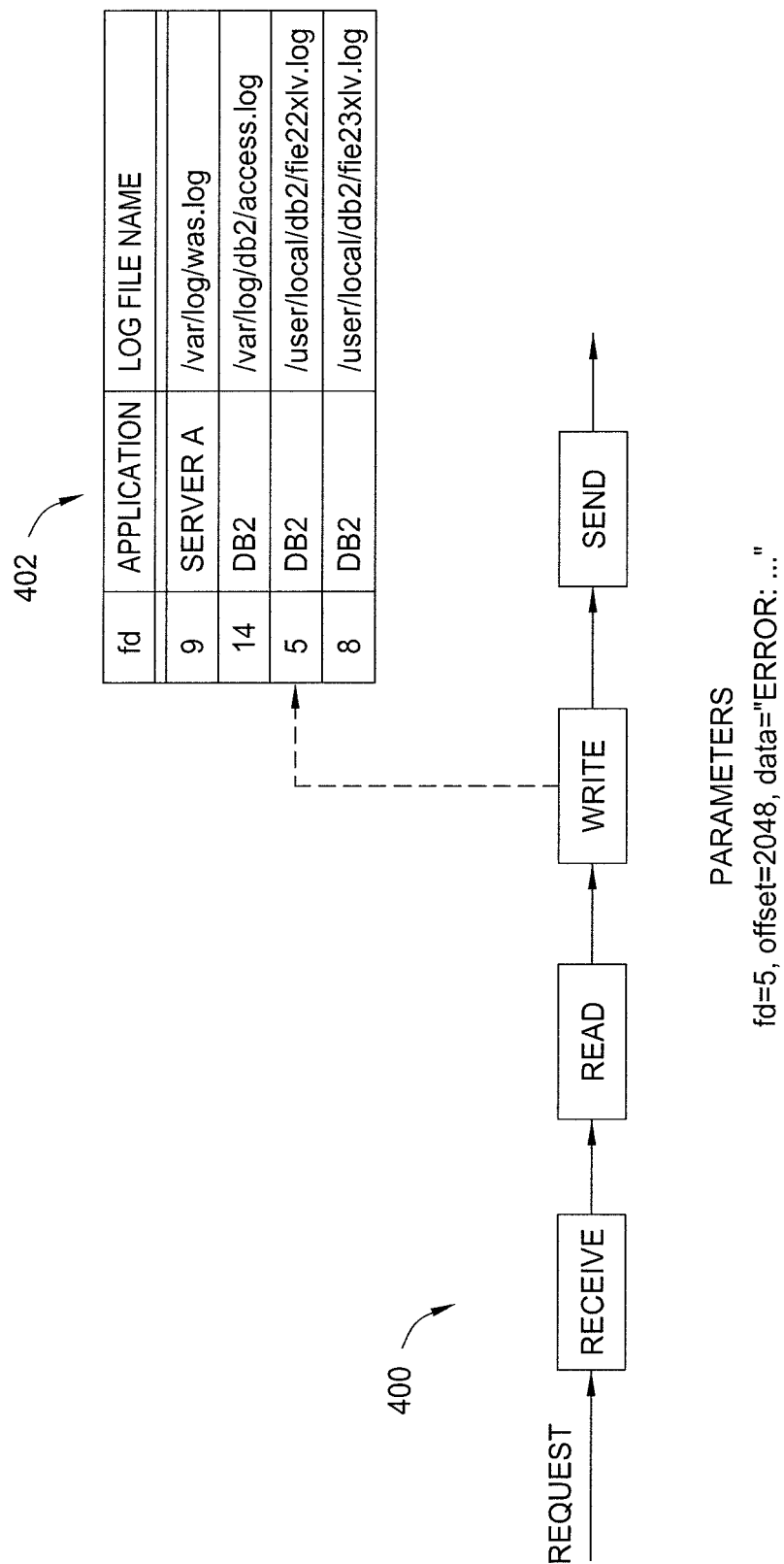
FIG. 4 illustrates a fragment of an exemplary transaction path for an incoming request to a distributed application.

The method 300 begins in step 302. In step 304, the monitoring agent 110 constructs or maintains a mapping between the identifiers of open files that have been opened by the distributed application (e.g., as triggered by "OPEN" events) and the file name strings of the corresponding files. Tracing open system calls allows one to identify the locations of all application logs, although this information could also be provided in whole or in part via direct input from a user (e.g., human administrator). FIG. 4, which illustrates a fragment of an exemplary transaction path 400 for an incoming request to a distributed application, depicts an exemplary map 402 that may be constructed in accordance with step 304. In the illustrated embodiment, the map 402 comprises a table in which the left-hand column lists the corresponding file identifiers ("fd"), the center column lists the applications that opened the files, and the right-hand column lists the file name strings. In one embodiment, the mapping is constructed and maintained based at least in part on prior knowledge of the application logs. In another embodiment, at least a portion of the mapping is constructed dynamically by monitoring open system calls and observing parameters containing file names.

In step 306, the monitoring agent 110 constructs a transaction path for an incoming request, from the system calls sent to the kernel 104. As illustrated in FIG. 4, the path 400 comprises a plurality of sequential system calls, such as "RECEIVE," "READ," "WRITE," "SEND," or other system calls. In one embodiment, the transaction path is constructed in accordance with the methods described in U.S. patent application Ser. No. 13/544,232, filed Jul. 9, 2012, which is herein incorporated by reference in its entirety.

In step 308, the monitoring agent 110 detects a log writing action. In one embodiment, the log writing action is detected by analyzing the parameters of a monitored system call.

In step 310, the monitoring agent 110 associates the log writing action with the system call that triggered the write. For instance, FIG. 4 illustrates that a particular entry in the map 402 has been associated with the "WRITE" system call. In particular, the parameter "fd=5" of the "WRITE" system call indicates that the system call should be associated with the entry in the map 402 that corresponds to the open file having the file identifier of "5."

In step 312, the monitoring agent 110 detects a keyword in the data to be written that indicates that the detected log writing action is the result of an error. For instance, a keyword such as "ERROR" (e.g., as illustrated in FIG. 4), "WARNING," "INFO," or the like in the parameters of the "WRITE" event may indicate the presence of an error.

Figure 5:
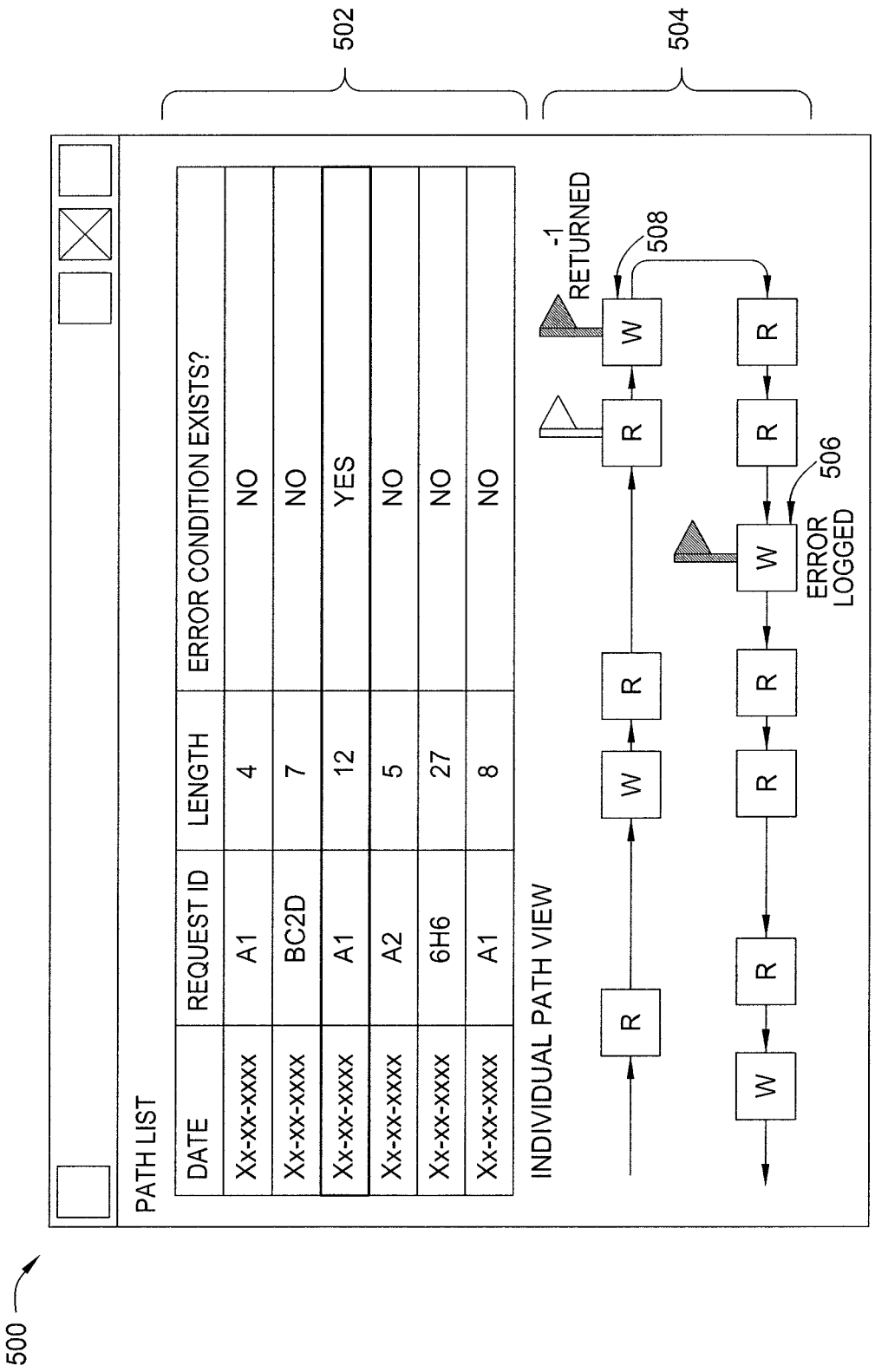
FIG. 5 illustrates an exemplary graphical user interface that may be used to help diagnose a distributed application.

In step 314, the monitoring agent 110 annotates the transaction path 400 with data relating to the log writing action in order to associate the write event with the detected error. In one embodiment, annotating the transaction path 400 in accordance with step 314 involves graphically marking the path in a graphical user interface (GUI) to indicate the error condition. FIG. 5, for example, illustrates an exemplary graphical user interface 500 that may be used to help diagnose a distributed application. As illustrated, the GUI 500 comprises a first section 502 and a second section 504. The first section 502 of the GUI 500 comprises a list or table that lists all of the paths associated with the distributed application. Each entry for a given path includes various information about the path, including, for example, the date on which the path was initiated, an identifier for the request that triggered the path, the length of the path (e.g., measured as the number of system calls making up the path), or whether an error condition is associated with the path. The second section 504 of the GUI 500 provides a detailed graphical view of an individual path selected from the list presented in the first section 502. By presenting to a user (e.g., human administrator) only the causally related system events that have lead to the log writing action, the time cost of application diagnosis can be greatly reduced.

For instance, in the example illustrated in FIG. 5, a path associated with a request identified as "A1" has been selected in the first section 502 of the GUI 500 and depicted in detail in the second section 504 of the GUI 500. The selected path includes a plurality of "READ" ("R") and "WRITE" ("W") events. One of the events—"WRITE" event 506—has been graphically marked (e.g., with a first flag) to indicate that an error has been logged in connection with this event.

However, just because the error was logged with the write event 506, it does not mean that the write event 506 is the root cause of the error. For instance, a previous event in the path may be the root cause of the error. Thus, the monitoring agent 110 traces backward in the path until a suspicious system call is located. The suspicious system call is a call whose parameters indicate unusual or unexpected activity (e.g., a system call return code, an error text message, a deviation from standard behavior, a path clustering, or the like). In this case, the "WRITE" event 508, which precedes the "WRITE" event 506, indicates that a system call return code of −1 was returned in associated with the "WRITE" event 508. The return code indicates a potential problem and makes the "WRITE" event 508 a possible root cause of the error logged at "WRITE" event 506. Thus, the "WRITE" event 508 is graphically marked (e.g., with a second flag) to indicate that the "WRITE" event 508 is a potential root cause of the observed error on the path. In one embodiment, the monitoring agent 110 does not stop tracing at the first suspicious system call, but continues to trace backward on the path in order to identify all potential root causes of the observed error. In one embodiment, multiple potential root causes are identified in this way, and the multiple potential causes may be ranked according to the likelihood of each actually being the root cause. In one embodiment, the potential root causes and their respective likelihoods are output or displayed to a human user in graphical (e.g., tabular) form.

Referring back to the method 300, once the transaction path 400 is annotated with the associated log writing actions, the method 300 returns to step 304, and the monitoring agent 110 continues to monitor the transaction paths and log writing actions as described above.

The method 300 provides an improved technique for tracing the root cause of problems that are detected in distributed applications. Moreover, associating transaction paths with application logs bridges the gap between operating system-level events (i.e., system calls) with application semantics. This allows a user to better understand from the application logs what tasks each path is intended to perform.

The method 300 thereby provides an online technique for diagnosing a problem in a distributed application. However, embodiments of the present invention also allow for offline diagnosis. In one embodiment, offline diagnosis according to the present invention involves using fault injection to build a knowledge base upon which offline diagnosis can be based.

Figure 6:
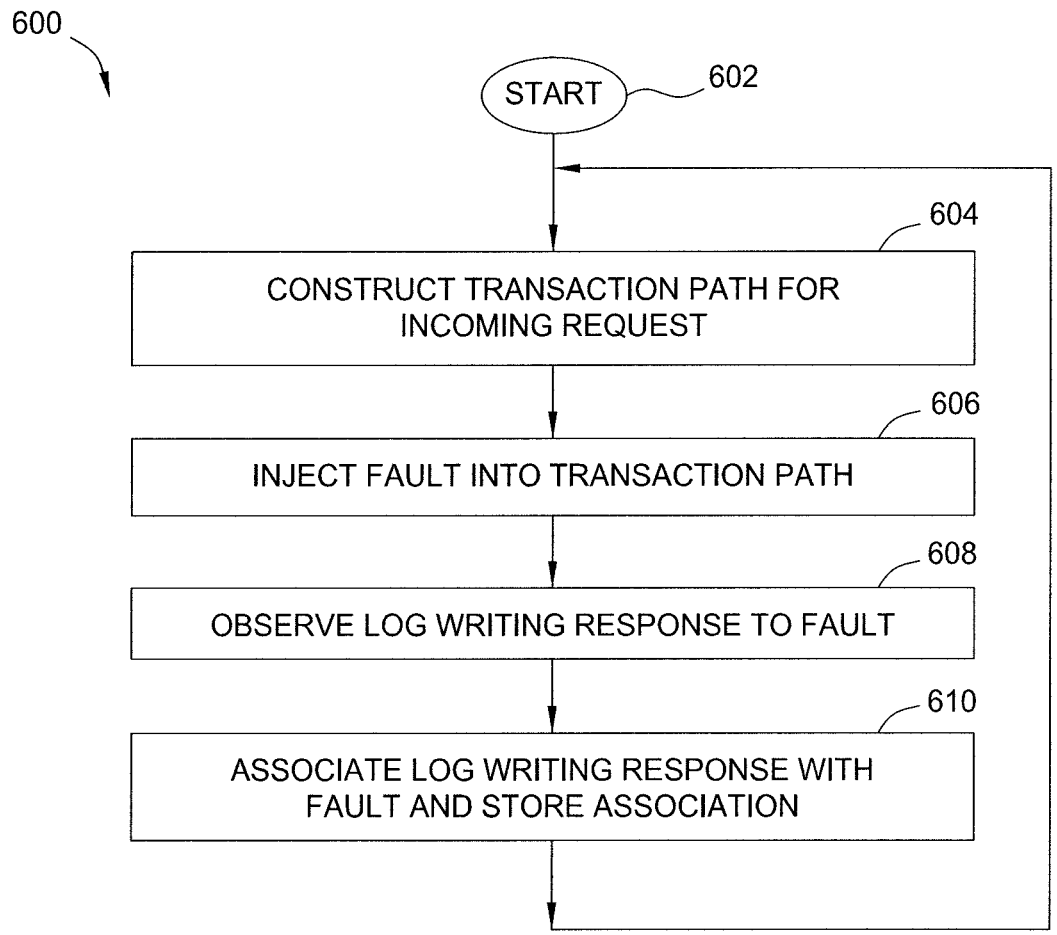
FIG. 6 is a flow diagram illustrating one embodiment of a method for diagnosing a problem in a distributed application, according to the present invention.

FIG. 6, for example, is a flow diagram illustrating one embodiment of a method 600 for diagnosing a problem in a distributed application, according to the present invention. The method 600 may be performed, for example, by a monitoring agent similar to the monitoring agents 110 illustrated in FIGS. 1 and 2. However, in one embodiment of the method 600, the server in which the monitoring agent is deployed is a replica of a production server.

Figure 7:
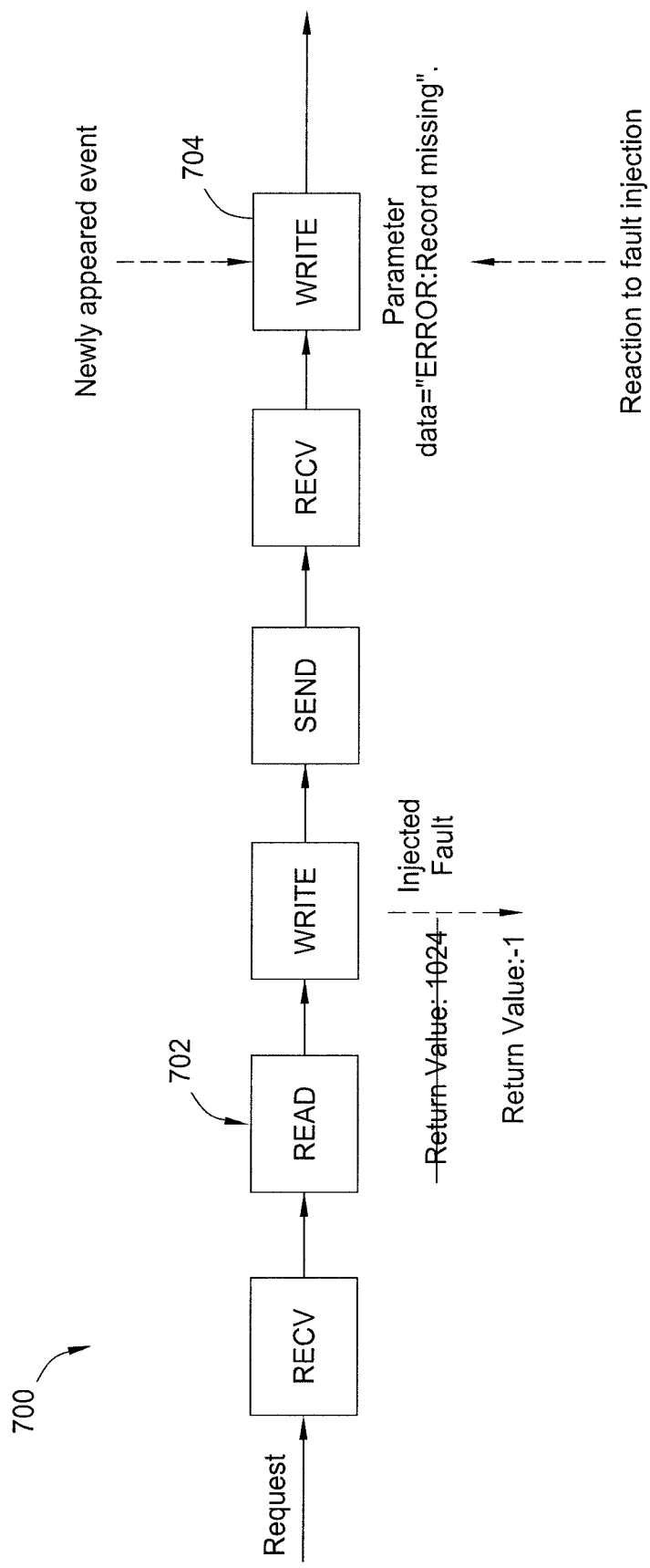
FIG. 7 illustrates a fragment of an exemplary transaction path for an incoming request to a distributed application.

The method 600 is in some ways similar to the method 300. The method 600 begins in step 602. In step 604, the monitoring agent injects a fault into the transaction path. In one embodiment, fault injection involves altering a return value of a system call. The return value of each system call in the transaction path may be altered one at a time. For instance, as illustrated in FIG. 7, which illustrates a fragment of an exemplary transaction path 700 for an incoming request to a distributed application, the return value of a "READ" system call 702 is altered from "1024" to "−1."

In step 606, the monitoring agent constructs the transaction path for an incoming request, from the system calls sent to the kernel 104. As illustrated in FIG. 7, the path 700 comprises a plurality of sequential system calls, such as "RECEIVE," "READ," "WRITE," "SEND," or other system calls. The log writing response to one or more of these system calls will be altered in response to the fault injected in step 604, as discussed in greater detail below.

In step 608, the monitoring agent observes a log writing response to the fault injected in step 604. The injected fault will cause an error to be logged at a later point in the transaction path. For instance, in FIG. 7, the fault injected at the "READ" system call 702 causes an error to be logged in connection with the "WRITE" system call 704. This error is illustrated in FIG. 7 as a missing record and is indicated in the parameters of the "WRITE" system call 704.

In step 610, the monitoring agent associates the log writing response observed in step 608 with the fault injected in step 604 and stores this association. The method 600 then returns to step 604, and the monitoring agent injects another fault at either another system call of the same path or at a system call of a different path. In one embodiment, the monitoring agent performs steps 604-610 for each system call of each transaction path until no system calls remain. This allows the monitoring agent to build a knowledge base that can be used to infer the root causes of problems that are observed later in a production server. In one embodiment, this knowledge base is modeled as a Bayesian belief network.

Thus, the meanings of application logs can be better understood by proactively injecting faults into the transaction paths and observing the log writing responses. Moreover, a fault model can be built based on this information that lists candidate causes for specific observed errors or symptoms.

Figure 8:
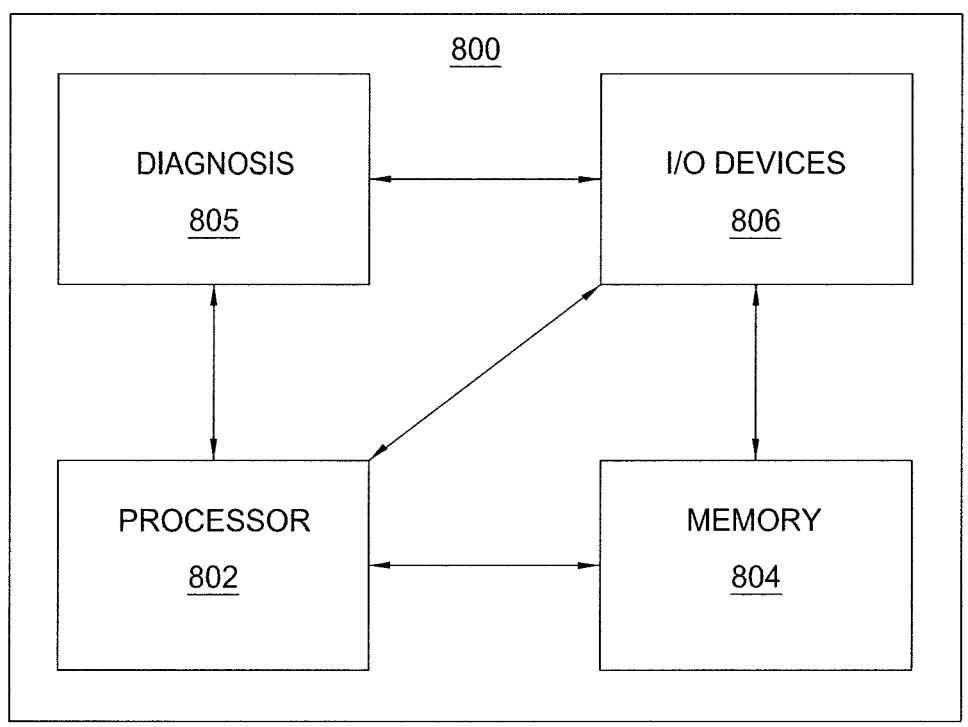
FIG. 8 is a high-level block diagram of the problem diagnosis method that is implemented using a general purpose computing device.

FIG. 8 is a high-level block diagram of the problem diagnosis method that is implemented using a general purpose computing device 800. The general purpose computing device 800 may comprise, for example, a portion of a server that supports a distributed application. In one embodiment, a general purpose computing device 800 comprises a processor 802, a memory 804, a diagnosis module 805 and various input/output (I/O) devices 806 such as a display, a keyboard, a mouse, a stylus, a wireless network access card, an Ethernet interface, and the like. In one embodiment, at least one I/O device is a storage device (e.g., a disk drive, an optical disk drive, a floppy disk drive). It should be understood that the diagnosis module 805 can be implemented as a physical device or subsystem that is coupled to a processor through a communication channel.

Alternatively, the diagnosis module 805 can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Thus, in one embodiment, the diagnosis module 805 for diagnosing distributed applications, as described herein with reference to the preceding figures, can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for monitoring a distributed application for errors, the method comprising:
   constructing a transaction path for each request received by the distributed application;
   detecting a writing action to a log of the distributed application; and
   annotating the transaction path in accordance with the writing action to produce an annotated transaction path.

2. The method of claim 1, further comprising:
   detecting that the writing action causes an error to be logged; and
   identifying a root cause of the error in accordance with the annotated transaction path.

3. The method of claim 2, wherein the detecting comprises:
   finding a keyword in data associated with the writing action, where the keyword indicates an error.

4. The method of claim 2, wherein the identifying comprises:
   tracing backward in the annotated transaction path from the writing action, at least until an unexpected activity is detected, wherein the unexpected activity is a candidate for the root cause.

5. The method of claim 4, wherein the unexpected activity is a system call return code.

6. The method of claim 4, wherein the unexpected activity is an error text message.

7. The method of claim 4, wherein the unexpected activity is a deviation from a standard behavior.

8. The method of claim 4, wherein the unexpected activity is a path clustering.

9. The method of claim 4, wherein the tracing results in a plurality of candidates for the root cause being identified.

10. The method of claim 9, wherein the plurality of candidates is ranked according to a likelihood of being the root cause.

11. The method of claim 1, wherein the transaction path comprises a sequence of system calls made by the distributed application.

12. The method of claim 1, wherein the annotating comprises:
    identifying an event in the transaction path that caused the writing action; and
    associating the writing action with the event in the transaction path.

13. The method of claim 12, wherein the identifying comprises:
    monitoring files that have been opened by the distributed application; and
    detecting that a file identifier specified by a parameter of the event matches a file identifier of one of the files that has been opened by the distributed application.

14. The method of claim 13, wherein the monitoring files comprises:
    maintaining a mapping that associates, for each of the files that has been opened by the distributed application, a file identifier to a file name string.

15. The method of claim 14, wherein at least a portion of the maintaining is performed dynamically.

16. The method of claim 14, wherein at least a portion of the maintaining is performed using prior knowledge of logs of the distributed application.

17. The method of claim 1, further comprising:
    injecting a fault into the transaction path, wherein the writing action is a response to the fault; and
    storing an association between the fault and the writing action.

18. The method of claim 17, wherein the injecting comprises:
    altering a return value of a system call in the transaction path.

19. The method of claim 17, further comprising:
    using the association to diagnose an error detected in the distributed application.

20. A method for building a knowledge base for use in diagnosing an error occurring in a distributed application, the method comprising: executing the distributed application on a replica of a production server that supports the distributed application; constructing a transaction path for a request received by the distributed application, wherein the transaction path traverses the replica; injecting a fault into the transaction path; detecting a writing action to a log of the distributed application, wherein the writing action is a response to the fault; annotating the transaction path in accordance with the writing action to produce an annotated transaction path; and storing an association between the fault and the writing action.

* * * * *